United States Patent [19]

Haeuser et al.

[11] Patent Number: 4,741,623
[45] Date of Patent: May 3, 1988

[54] CASTING SYSTEM FOR THE PROCESSING OF CASTING RESIN

[75] Inventors: Erhard Haeuser, Schoeffengrund; Frank Duchscherer, Asslar-Werdorf, both of Fed. Rep. of Germany

[73] Assignee: Wilhelm Hedrich Vakuumanlagen GmbH & Co. KG, Ehringshausen, Fed. Rep. of Germany

[21] Appl. No.: 876,142

[22] Filed: Jun. 19, 1986

[30] Foreign Application Priority Data

Jun. 27, 1985 [DE] Fed. Rep. of Germany ....... 3522922

[51] Int. Cl.[4] .................... B01F 15/04; G05D 11/00
[52] U.S. Cl. .................................. 366/160; 366/146; 425/200; 222/318
[58] Field of Search ............... 366/150, 152, 154, 159, 366/160, 161, 162, 139, 19, 22, 144, 145, 146; 425/130, 200; 222/318, 246, 260

[56] References Cited

U.S. PATENT DOCUMENTS

| 3,107,034 | 10/1963 | Dunnous | 366/161 |
| 3,684,250 | 8/1972 | Roeser | 366/161 |
| 4,118,799 | 10/1978 | Krueger | 366/161 |
| 4,171,191 | 10/1979 | Krueger | 366/161 |
| 4,404,168 | 9/1983 | Baumberger | 425/200 |

Primary Examiner—Robert W. Jenkins
Attorney, Agent, or Firm—Flynn, Thiel, Boutell & Tanis

[57] ABSTRACT

Casting resin components (4,5) coming together in a mixer (6) are dosed and circulated by means of pump structures (3). Each pump structure (3) has a dosing pump (17, 9) and a circulating pump (16, 10). The piston (17) of the dosing pump (17, 9) does not leave its cylinder bore (9) during a pure circulation operation, while the piston (16) of the circulating pump (16, 10) alternately exits from its cylinder (10) and again moves into same.

Since the same drive is used for the circulating pump (16, 10) and the dosing pump (17, 9), the expense of the system is low.

17 Claims, 3 Drawing Sheets

CASTING SYSTEM FOR THE PROCESSING OF CASTING RESIN

FIELD OF THE INVENTION

The invention relates to a casting system for the processing of casting resin, comprising at least two, preferably evacuatable storage containers for casting resin components, dosing pumps associated with the storage containers, a mixer arranged after the dosing pumps and circulating devices for circulating the casting resin components in the storage containers.

BACKGROUND OF THE INVENTION

Casting systems of this type have the advantage that the components are well prepared for further processing due to circulation. Circulation causes a continuous mixing of the masses, whereby possible fillers are kept afloat and, in the case of evacuated storage containers, a good degassing occurs. Mixing effects a general homogenization of the components, for example also a constant temperature. Special conveying devices are used for circulating the masses in the storage containers in casting systems for the processing of several components, which must come together in one mixer. A dosing pump follows each storage container, with which dosing pump the component contained in the associated container is measured for a mixer. Both the circulating devices and also the dosing pumps have a separate drive, so that the known systems are structurally complicated and thus also expensive.

The basic purpose of the invention is to provide a casting system of the abovementioned type such that the expense of the structure is reduced.

This purpose is attained according to the invention by associating a pump structure with at least one storage container, which pump structure has a piston rod on which is provided a first piston of a circulating pump and a second piston of a dosing pump, whereby the circulating pump effects a circulation cycle of the associated storage container.

Only one drive is needed in a so constructed casting system, with which drive both the circulating of the mass components is kept going and also the dosing of the components occurs. With this the expensive of the structure is substantially reduced.

It is possible both to arrange the pump structure inside of the respective storage container and also externally of the storage container. If several pump structure are used, as this is usually the case, then these can be operated preferably in synchronism. The synchronous operation permits in particular the use of a stationary mixer, thus a mixer which is particularly reliable in operation.

The pump structure are constructed preferably without valves. Other constructions are also possible, for example constructions with valves. A valveless construction has the particular advantage, that it is particularly well suited for the processing of viscous masses, which possibly contain abrasive fillers.

The basic construction can be designed in various ways. For example, the mass can be guided through the first piston and can be conveyed upwardly above the piston. The conveying can hereby occur through the hollow constructed piston rod. This design is well suited for pump aggregates arranged within the storage containers, however, is also possible in externally arranged pump structure. The mass can also be lifted by the piston itself, whereby a check valve is arranged in the opening.

The circulation permits in particular also the spreading out of the masses to form thin layers, from which gasses entrapped in the mass can escape particularly easily. Therefore, means are preferably provided for such a spreading out. To prevent a settling of fillers, the storage containers have preferably sloping inclined bases.

According to a further development of the invention, supports for the mass packaging containers are arranged in the storage containers. This has the advantage that the packaging containers can be stored in the storage containers for the purpose of facilitating the discharge of the mass contained therein. In this manner a convenient and complete emptying of the packaging containers is possible. The supports can be constructed as grates.

Caplike lids are advantageously provided on the storage containers. The moving in and removal of the packaging containers is thus particularly convenient. The lids are preferably suspended on swingable arms for an easy opening and closing of the containers. A complete and also quick emptying is aided if a heating system is provided in the area above the supports for the packaging containers.

The pump structures are preferably individually controllable. This facilitates a flushing, for example, a flow mixer with an individual, thus not activated, component.

BRIEF DESCRIPTION OF THE DRAWINGS

Exemplary embodiments of the invention are schematically illustrated in the drawings, in which.

DETAILED DESCRIPTION

Figure 1:
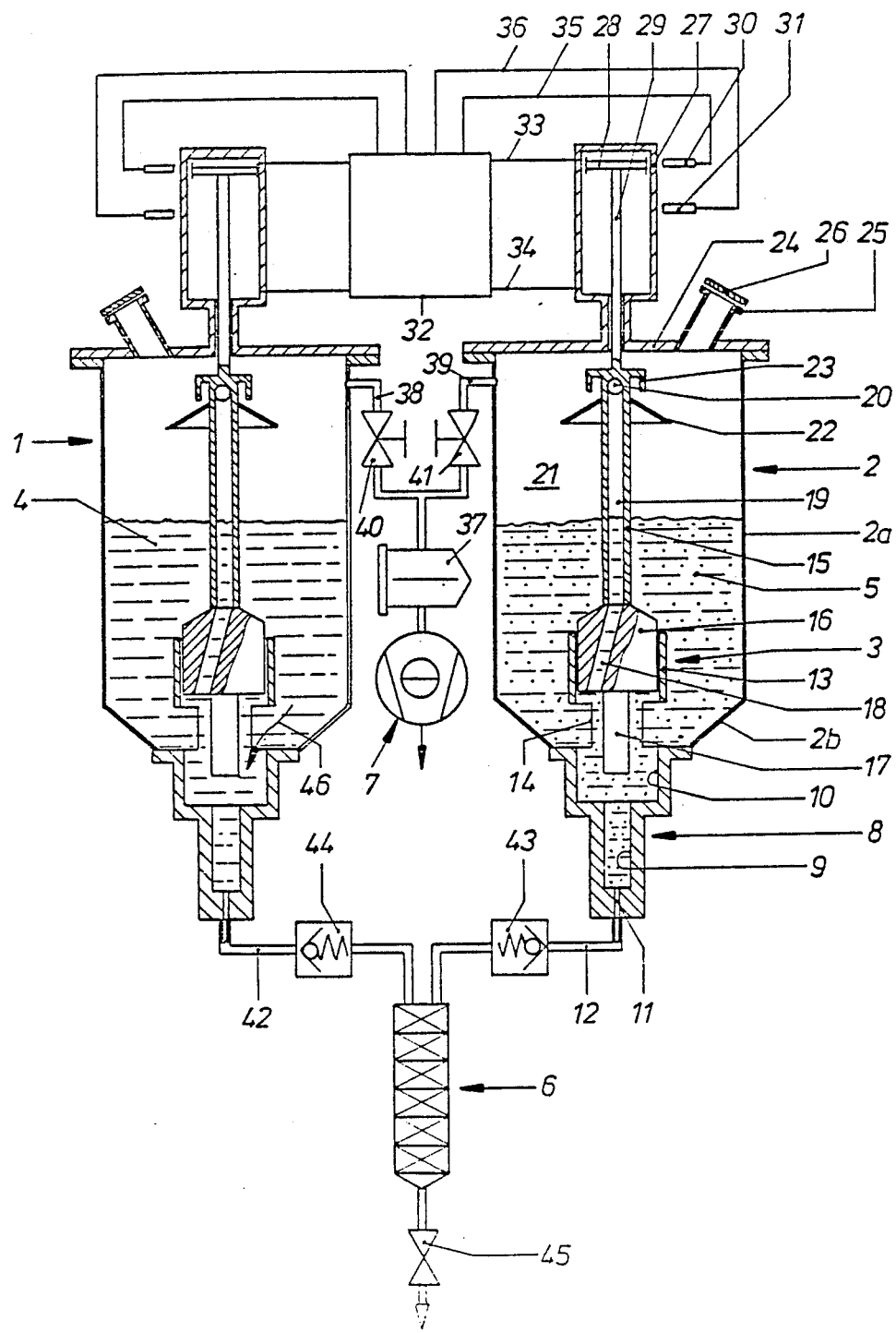
FIG. 1 illustrates a casting system with two storage containers, whereby the pump structures are arranged within the containers.

The casting system according to FIG. 1 has two storage containers 1 and 2 within the same construction. A pump structure 3 is arranged within each storage container, which pump structure at the same time forms a dosing pump. The dosing pumps of the pump structure 3 convey component masses 4,5 contained in the storage containers 1,2 to a mixer 6. The storage containers 1, 2 can be evacuated by means of a vacuum pump 7.

Since the containers 1, 2 and the pump structures 3 arranged therein are of the same construction, the subsequent discussion of the storage container 2 and the pump structure arranged therein is sufficient. The storage container 2 has a cylindrical sleeve 2a and a conical base 2b. A pump housing 8 is connected to the base 2b. The pump housing contains a lower cylinder bore 9 and an upper cylinder bore 10, the diameter of which is larger than the diameter of the cylinder bore 9. A discharge opening 11 extends through the base of the cylinder bore 9 and has a pipeline 12 connected thereto.

A piston guide 13 is connected to the pump housing 8 and has large laterally facing openings 14 through which component mass 5 may enter.

The pump structure has a piston rod 15, at the lower end of which is provided a first piston 16 and a second piston 17. The second piston 17 fits into the lower cylinder bore 9 and the first piston 16 into the upper cylinder bore 10. A channel 18 is provided in the first piston 16, which channel 18 opens outwardly at the underside of the piston 16 and at the top into a cavity 19 provided within the piston rod 15. The cavity 19 is connected to the container chamber 21 through openings 20. A conical discharge chute 22 is mounted to the piston rod 15 below the openings 20. The openings 20 are protected from above by a shield 23, which also facilitates an even distribution of the material on the shield.

The container is closed off with a lid 24, which is mounted airtight on the container. A filling port 25 is provided on the lid for filling the container with component mass 5. The filling port 25 is closed by a lid 26, in which a display glass may possibly be provided.

A pressure-medium cylinder 27, for example a hydraulic cylinder, is mounted on the lid 24. A drive piston 28 is slidable in the pressure-medium cylinder 27, which piston 28 is connected to a piston rod 29, which in turn is fixedly connected to the piston rod 15. An upper limit switch 30 and a lower limit switch 31 are associated with the pressure-medium cylinder 27.

A drive mechanism which as a whole is identified by the reference numeral 32 is used to load the pressure-medium cylinder 27 with pressure medium. Pressure-medium lines 33, 34 extend from the drive mechanism to the top and bottom of the double-acting pressure-medium cylinder 27. The limit switches 30, 31 are connected to the drive mechanism 32 through control lines 35, 36.

A cutter 37 is provided in front of the vacuum pump 7. The storage containers 1,2 are connected to the vacuum pump 7 through suction lines 38, 39. Valves 40, 41 can be provided in the suction lines 38, 39.

Both dosing pumps, consisting of the second piston 17 and the lower cylinder bore 9, are connected through pipelines 12 or 42 to the mixer 6 which is constructed preferably as a stationary mixer. Check valves 43, 44 are provided in the pipelines 12, 42, which check valves permit a flow only toward the mixer 6 and block flow in the opposite direction. A casting valve 45 is provided at the output of the stationary mixer 6. The casting valve 45 could also lie in a vacuum chamber.

The system according to FIG. 1 operates as follows. A position of the pump structures, as it is assumed prior to a dosing stroke, is illustrated. The pistons 16, 17 are in their uppermost position. The second piston 17 (dosing piston) is pulled out of the lower cylinder bore 9 in this position. The first piston 16 (circulating piston) is provided above the laterally facing openings 14. The cylinders 9, 10 are filled with component mass 4 or 5. The filling is done by afflux corresponding with the arrow 46, which is drawn in the storage container 1, that is, the component mass moves through the openings 14 into the cylinders 10 and 9.

When the largest possible dosing stroke is supposed to be carried out, the piston rods 15 are moved downwardly over their total possible path of movement, whereby the piston 28 within the drive cylinder 27 comes close to the lower end of the drive cylinder. Pressure medium is hereby supplied through the pressure-medium lines 33 and pressure medium which is provided below the piston 28 flows out through the pressure-medium line 34. The lower end of the dosing piston 17 penetrates, after a certain path of movement, into the cylinder bore 9. The component masses 4,5 are moved out of the bores 9 upon a further downward movement. It is assumed that the downward movement of both piston rods 15 occurs synchronously. Component mass 4 and 5 is now pressed simultaneously into the stationary mixer 6 at a specific proportion, in the illustrated case at the proportion 1:1, where a complete mixing occurs and thus an activated casting mass is formed, which exits through the casting valve 45.

After a certain path of movement of the dosing piston 17 within the cylinder 9, the circulating piston 16 also moves into the cylinder 10, after which the laterally facing openings 14 are closed off. The component mass contained in the cylinder 10 is removed and is pressed through the channel 18 into the cavity 19 of the piston rod 15. A portion of the component mass is finally pressed out through the openings 20 and spreads out on the discharge chute 22 to form a thin layer, so that an intensive degassing occurs. It is assumed that the containers 1, 2 are maintained at a low pressure by means of the vacuum pump 7.

If a further dosing is presently not to take place after the described dosing stroke, however the component masses 4,5 are to be circulated, the piston rods 15 are only yet moved through such a range that the dosing pistons 17 remain at all times within the lower cylinders 9. The circulating pistons 16, however, are pulled back sufficiently far that the laterally facing openings are partially opened, so that component mass can flow into the cylinders 10. However, a flow on into the bores 9 is not possible, since these are blocked off by the dosing pistons 17. The pistons 16 are moved to their lowermost position during one circulating stroke, whereby component mass, as already described in connection with the dosing stroke, is pressed into the cavity 19 and flows out of the openings 20.

The upper limit switch 30 determines the uppermost position of the piston rod 15, which at all times precedes a dosing stroke and the lower limit switch 31 determines the upper limit position of the piston rod 15 during the circulation operation.

If the mixer 6 is supposed to be flushed with a not activated mass in order to prevent, during a subsequent interruption in operation, casting mass from hardening in the statics mixer 6, one can proceed as follows. It is assumed that flushing is supposed to be done with component mass 5. The pump structure which is in the storage container 1 is either switched over to circulation operation or is brought into a rest position in which the dosing piston 17 is received in the cylinder 9 without moving therein. The pump structure in the storage container 2 is operated such that component mass 5 is pressed into the stationary mixer 6, whereby preferably the full stroke is carried out, thus from the illustrated initial position to the lowermost point of the piston rod 15. Several such strokes may be necessary for a complete flushing.

The embodiment according to FIG. 2 has again two storage containers 47 and 48. A pump structure 49 is associated with each storage container 47, 48, which pump structure, however, is not arranged within, but outside of the associated storage container. The two storage containers 47 and 48 and the associated pump structures 49 are here too of the same construction, for which reason the description of one container together with pump structures is sufficient.

The storage container 48 has a lower part 50 and a cap 51. The lower part 50 of the container has a sloped bottom 52, which slopes downwardly to a lower discharge pipe 53 arranged laterally on the container 48. A feed pipe 54 terminates in the container 48 at a discharge chute 55 provided in the upper area of the lower part 50 of the container.

A sealing flange 56 is provided at the upper edge of the lower part of the container, the cap 51 resting airtight on the flange 56. A grate 57 is arranged just below the flange 56, which grate serves as a support for a packaging container 58, into which component mass 59 or 60 was delivered.

The cap 51 is suspended from an arm 61, which can be lifted and lowered in direction of the double arrow 62 and is pivotal about the axis 63, which causes both caps 51 to be able to be simultaneously lifted off and swung to the side.

The pump structure 49 has a large upper pump cylinder 64 and a lower small pump cylinder 65. A first piston 66 (circulating piston) fits into the pump cylinder 64 and a second piston 67 (dosing piston) fits into the small pump cylinder 65. The two pistons 66, 67 are fixedly connected to one another and are operated by means of a piston rod 68 connected to a drive piston to be movably received in a drive cylinder 69.

An opening 71 which can be closed off by a check valve 72 is provided in the piston 66. The check valve 72 prevents a flow from above downwardly, however, permits a flow from below upwardly.

A drive mechanism 32' is again associated with the drive cylinders 70, from which drive mechanism 32' extend suitable pipelines just like from the drive mechanism 32 according to FIG. 1. Also a vacuum pump 7' is provided for evacuating the storage containers 47, 48. Suction occurs through the feed pipes 54, cavities 73 within the pump cylinders 64 and pipelines 74. A stationary mixer 6' is again connected to the pump cylinders 65 through lines having check valves therein.

The system according to FIG. 2 operates as follows. To supply the system with component mass 59 and 60, the caps 51 are lifted off and packaging containers 58, which contain component masses 59, 60 are placed with their opening oriented in a downwardly facing direction onto the grates 57. The caps 51 are subsequently again placed over the packaging containers and grates. This operation can for example take place after working hours, so that much time is available to permit the often viscous component mass to flow out of the packaging containers 58. In order to remove also viscous masses as thoroughly as possible, a heating system 75 can be associated with each container 47, 48.

The initial position prior to a dosing stroke is here also shown, which dosing stroke takes place in the same manner as this was described in connection with FIG. 1. When the lower edge of the piston 66 has completely passed the discharge pipe 53, component mass which is provided below the piston 66 must flow through the opening 71 through the piston 66. When the piston 66 again moves upwardly, the component mass which is above the piston is lifted, since a return flow is prevented by the valve 72. A portion of the component mass provided above the piston 66 is thereby lifted up into the area of the feed pipe 54 and flows then over into the container 50, whereby it spreads out on the discharge chute 55 to form a thin layer.

A pure circulating operation is also possible in this system during which the dosing piston 67 remains always in the cylinder 65.

Figure 2:
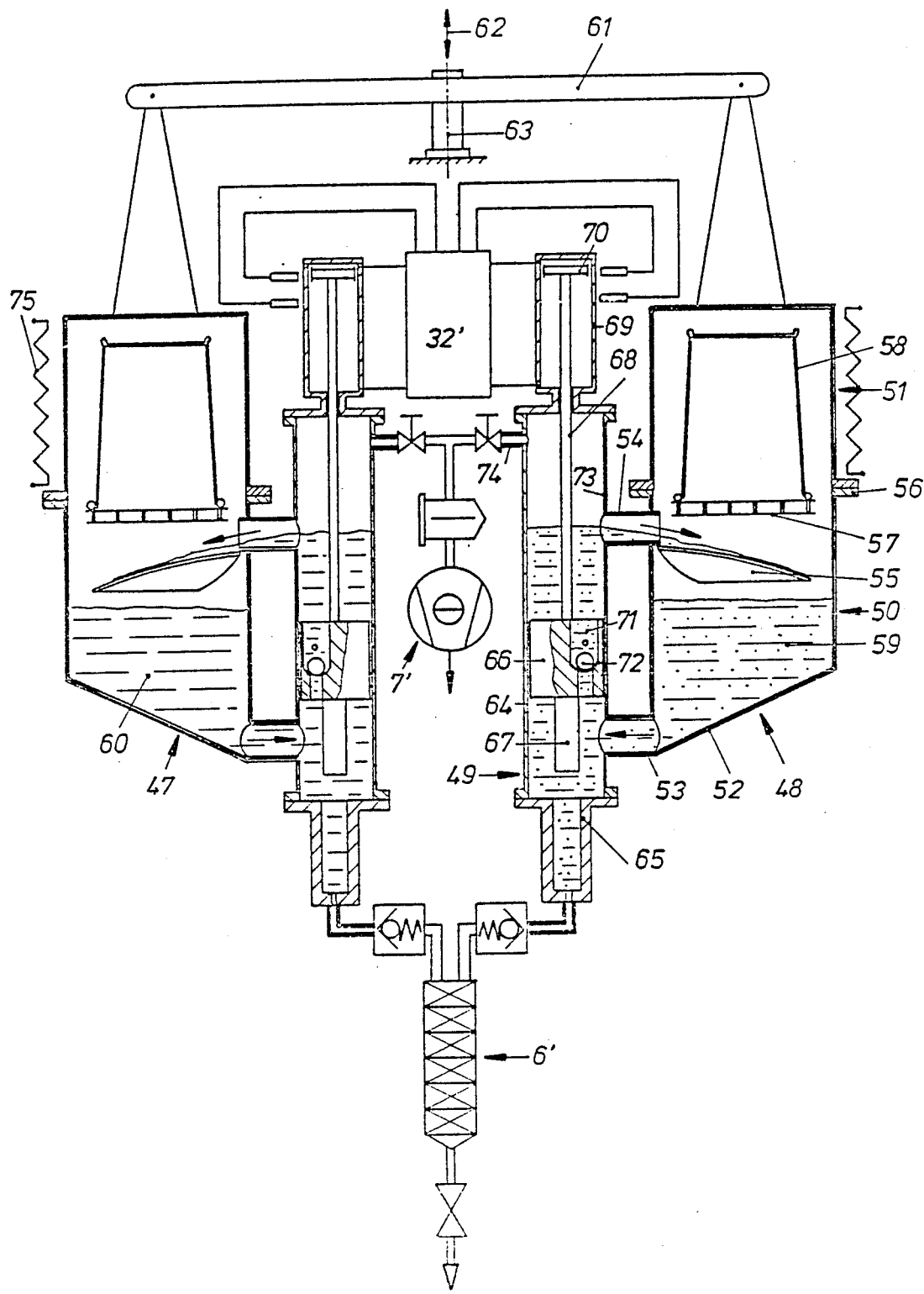
FIG. 2 illustrates a casting system with two containers, with which pump structures are associated and which are arranged outside of the containers.
Figure 3:
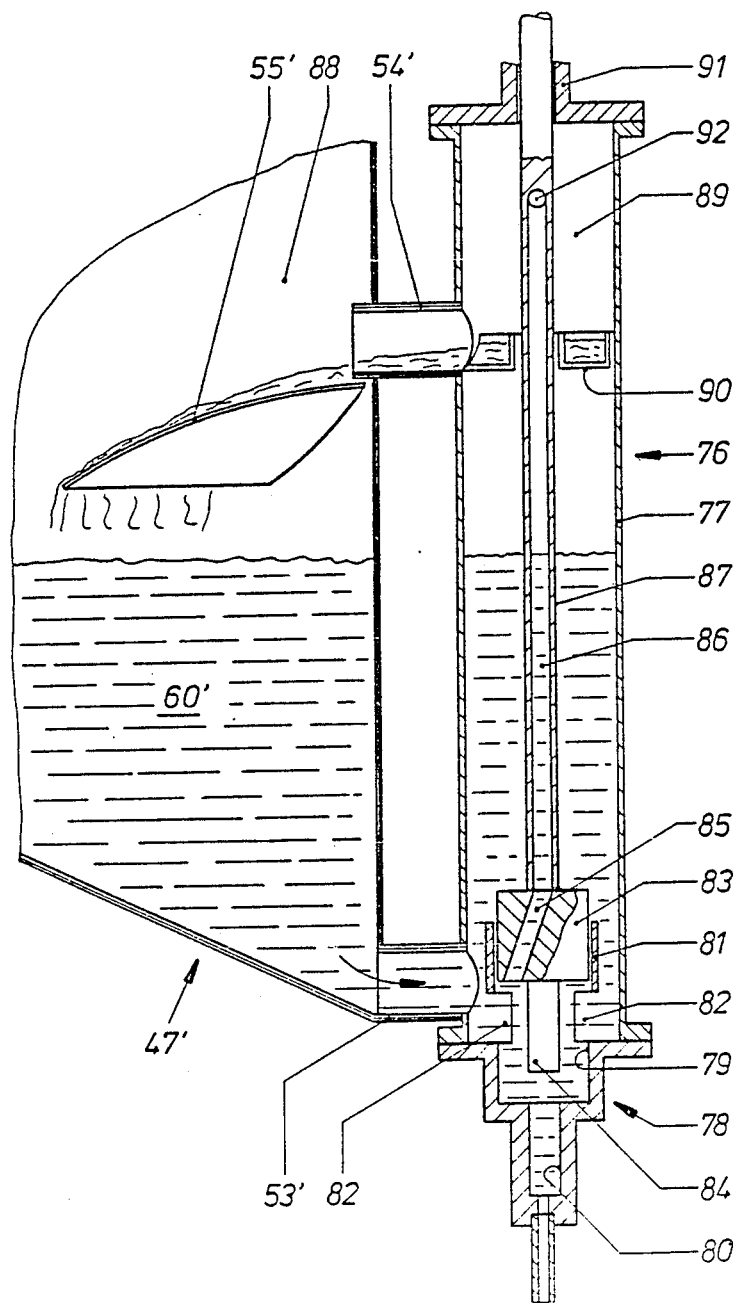
FIG. 3 illustrates the lower part of a storage container and a structures attached to the outside of the container according to a further embodiment of the invention.

FIG. 3 illustrates a modification for a system according to FIG. 2. The containers can hereby be constructed alike as this is the case in the embodiment according to FIG. 2. The container is therefore identified by the reference numeral 47'. The pump structure 76, however, has a different design. The pump structure 76 has an outer pipe 77, the inside of which communicates with the discharge pipe 53' of the container 47'. A pump housing 78 is connected to the lower end of the pipe 77, which pump housing contains a large upper cylinder bore 79 and a small lower cylinder bore 80. A piston guide 81 having laterally facing openings 82 extends upwardly from the pump housing.

A first piston 83 (circulating piston) having a large diameter is guided in the piston guide 81. A second piston 84 (dosing piston) is attached below to the first piston 83. The piston 83 fits into the cylinder 79 and the piston 84 into the cylinder 80. The circulating piston 83 contains a channel 85, which opens outwardly at the bottom surface of the circulating piston 83 and communicates with a longitudinal channel 86 in a piston rod 87, to which the pistons 83, 84 are secured. The construction of the pump structure 76 thus corresponds substantially with the construction of the pump structure 3 according to FIG. 1, however, with the difference that the pump structure 76 is arranged outside of the container 47' and therefore is surrounded by a pipe 77. The pipe 77 can be understood so to speak as a side chamber of the container 47', since a constant communication exists between the inside spaces 88 of the container 47 and 89 of the pipe 77.

A feed pipe 54', which connects the inside space 89 of the pipe to the inside space 88 of the container, is provided in the upper region of the pipe 77. A trough 90 is arranged in the pipe 77 below the feed pipe 54, which trough catches the component mass 60' which exits through openings 92 in the piston rod 87. An entrance passageway 91 for the piston rod 87 is free from component mass and therefore does not create any sealing difficulties, which is of a particular advantage, since the entrance passageway 91 must be vacuum-tight.

The component mass 60 is circulated by being pressed upwardly in the piston rod channel 86, by exiting through the openings 92 and by flowing from there into the trough 90. The component mass moves from the trough 90 through the feed pipe 54' into the container 47', whereby it first moves onto a discharge chute 55' and spreads there out to form a thin layer.

The system according to FIG. 3 is moreover operated analogously like the system according to FIGS. 1 and 2.

The embodiments of the invention in which an exclusive property or privilege is claimed are defined as follows:

1. A casting system for the processing of casting resin, comprising:
  at least two storage containers adapted to hold casting resin components therein;
  first pumping means for removing casting resin components from a first of said two storage containers and for conveying of casting resin components to a first discharge opening, and first recirculating means for recirculating casting resin components within said first storage container, said first recirculating means including a first piston, a first piston chamber slidably receiving therein said first piston, and means for facilitating a circulation of said casting resin components within said first storage container in response to a relative movement occurring between said first piston and said first piston chamber, said first pumping means including a second piston affixed to said first piston, and a second piston chamber slidably receiving therein said second piston, said second piston chamber having said first discharge opening therein;

second pumping means for removing casting resin components from a second of said two storage containers and for conveying of casting resin components to a second discharge opening, and second recirculating means for recirculating casting resin components within said second storage container;

pipeline means connected at one end to said second discharge opening and said first discharge opening;

passageway means for admitting casting resin components from said first storage container into at least said second piston chamber when said second piston is removed therefrom so that as said second piston enters said second piston chamber, said casting resin components will be urged through said first discharge opening to said pipeline means;

means defining a mixer connected to the other end of said pipeline means for mixing together said casting resin components from said first and second storage containers; and drive means connected to said first and second pumping means for effecting a synchronous driving of said first and second pumping means to effect a simultaneous urging of said casting resin components in both of said first and second storage containers to said mixer means through said pipeline means.

2. A casting system according to claim 1, wherein said first pumping means is arranged inside of said first storage container.

3. A casting system according to claim 1, wherein said first pumping means is arranged outside of said first storage container.

4. A casting system according to claim 1 wherein the mixer is a stationary mixer.

5. A casting system according to claim 1, wherein said first and second piston chambers are vertically spaced from one another, said second piston chamber being lower than said first piston chamber, said second piston being received in said second piston chamber so that a filling of said second piston chamber occurs in response to said second piston being removed therefrom, whereby said second piston during back and forth movements of a piston rod connected thereto for the purpose of circulation is continuously sealingly received in said second piston chamber, and said first piston is movable in said first piston chamber, whereby said first and said second pistons are stationary relative to one another and the stroke of said piston rod is variable, whereby said piston rod is moved during one circulating stoke between an endmost position and an intermediate position to cause said piston rod to be moved into a filling position which lies beyond said intermediate position and a further position in which said second piston is pulled out of said second piston chamber and whereby said piston rod, starting out from the filling position, is moved first through a closing stroke, at the end of which said second piston is sealingly received in said second piston chamber, said piston rod thereafter being moved along a possibly adjustable dosing stroke further into said second piston chamber and a dosing end position which limits the dosing stroke.

6. A casting system according to claim 5, wherein said first piston has a piston opening therein and mass is pressed through said opening during said dosing stroke.

7. A casting system according to claim 6, wherein said piston rod is constructed hollow and said piston opening communicates with said hollow interior of said piston rod, whereby said hollow interior communicates at an upper region thereof with the inside chamber of said first storage container through at least one laterally facing piston rod opening.

8. A casting system according to claim 7, wherein in a pump structure arranged outside of said first storage container, there is arranged below said piston rod opening, however, above the mass level in said first storage container a collecting trough in a pipe surrounding said piston rod, which pipe is connected to the inside of said first storage container through a connecting line.

9. A casting system according to claim 7, wherein a check valve is arranged in said piston opening and the mass in said first piston chamber is moved upwardly to a level above the mass level in said first storage tank whereat said first piston chamber is connected to the inside of said first storage container.

10. A casting system according to claim 1, wherein in at least one of said two storage containers above the mass level there are arranged means for spreading out the mass to form a thin layer.

11. A casting system according to claim 1, wherein said two storage containers each have bases which slope downwardly toward their lower discharge openings, which bases, when said pump structures are arranged externally, slope downwardly toward a lateral container opening.

12. A casting system according to claim 1, wherein supports for mass packaging containers are arranged in said storage containers.

13. A casting system according to claim 12, wherein the supports are constructed as grates.

14. A casting system according to claim 12, wherein said storage containers have cap shaped lids and said supports are arranged in a separating plane or near said separating plane between a lower part of said container and said lid therefor.

15. A casting system according to claim 14, wherein lids of storage containers are suspended from a liftable and swingable arm which is pivotal about an axis lying between said containers.

16. A casting system according to claim 12 wherein a heating system is provided in the area above the supports (57) for said containers.

17. A casting system according to claim 1, wherein means is provided for individually controlling said first and second pumping means so that only one pump structure conveys mass to the mixer.

* * * * *